(12) United States Patent
Telfer

(10) Patent No.: US 11,641,458 B2
(45) Date of Patent: May 2, 2023

(54) AUTOSTEREOSCOPIC DEVICES AND METHODS FOR PRODUCING 3D IMAGES

(71) Applicant: E INK CORPORATION, Billerica, MA (US)

(72) Inventor: Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 268 days.

(21) Appl. No.: 17/116,179

(22) Filed: Dec. 9, 2020

(65) Prior Publication Data

US 2021/0185302 A1   Jun. 17, 2021

Related U.S. Application Data

(60) Provisional application No. 62/948,926, filed on Dec. 17, 2019.

(51) Int. Cl.
*H04N 13/312* (2018.01)
*H04N 13/32* (2018.01)
*H04N 13/361* (2018.01)

(52) U.S. Cl.
CPC .......... *H04N 13/312* (2018.05); *H04N 13/32* (2018.05); *H04N 13/361* (2018.05)

(58) Field of Classification Search
CPC ..... H04N 13/312; H04N 13/32; H04N 13/361
USPC ........................................................ 349/161
See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 6,130,774 A | 10/2000 | Albert et al. |
| 6,144,361 A | 11/2000 | Gordon, II |
| 6,172,798 B1 | 1/2001 | Albert et al. |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,801,233 B2 | 10/2004 | Bhatt et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |

(Continued)

OTHER PUBLICATIONS

Korean Intellectual Property Office, International Search Report and Written Opinion, PCT/US2020/063911, dated Apr. 6, 2021.

*Primary Examiner* — Charles S Chang

(74) *Attorney, Agent, or Firm* — Ioannis Constantinides

(57) ABSTRACT

An autostereoscopic device and a method for generating an autostereoscopic image are disclosed. The device includes a substrate, a first image-forming layer disposed on the substrate, a second image-forming layer, a light-transmissive layer positioned between the first image-forming layer and the second image-forming layer, and an addressing unit. The addressing unit is used to substantially simultaneously adjust the first image-forming layer and the second image-forming layer in order to generate an autostereoscopic image. The image-forming layers may be thermally sensitive or they may include capsules containing electrophoretically responsive particles.

13 Claims, 3 Drawing Sheets

(56) References Cited

U.S. PATENT DOCUMENTS

| | | |
|---|---|---|
| 7,312,784 B2 | 12/2007 | Baucom et al. |
| 7,408,563 B2 | 8/2008 | Busch et al. |
| 7,408,696 B2 | 8/2008 | Liang et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,174,564 B2 | 5/2012 | Kim et al. |
| 8,325,416 B2 | 12/2012 | Lesage et al. |
| 8,576,470 B2 | 11/2013 | Paolini, Jr. et al. |
| 8,576,476 B2 | 11/2013 | Telfer et al. |
| 9,146,403 B2 | 9/2015 | Lanman et al. |
| 9,279,906 B2 | 3/2016 | Kang |
| 9,335,553 B2 | 5/2016 | Lanman et al. |
| 9,341,916 B2 | 5/2016 | Telfer et al. |
| 10,444,553 B2 | 10/2019 | Laxton |
| 2013/0033488 A1* | 2/2013 | Takahashi .............. H04N 13/32 345/419 |
| 2015/0005720 A1 | 1/2015 | Zang |
| 2016/0012710 A1 | 1/2016 | Lu et al. |
| 2017/0337880 A1 | 11/2017 | Nishiike et al. |

\* cited by examiner

AUTOSTEREOSCOPIC DEVICES AND METHODS FOR PRODUCING 3D IMAGES

RELATED APPLICATIONS

This application claims priority to U.S. Provisional Patent Application No. 62/948,926 filed on Dec. 17, 2019, which is incorporated by reference in its entirety, along with all other patents and patent applications disclosed herein.

FIELD OF THE INVENTION

The present invention relates to the field of 3D image devices, more specifically autostereoscopic devices that include parallax barriers.

BACKGROUND OF THE INVENTION

An autostereoscopic device is able to produce a 3D image without the need for special glasses. Some autostereoscopic devices include parallax barriers. A conventional parallax barrier includes a layer having a fixed pattern of light barriers and slits or pinholes. The parallax barrier is placed in front of and spaced apart from a second layer, an image-forming layer, which provides image specific information. The parallax barrier selectively blocks light emitted or modulated by the second layer such that the left and right eyes of a suitably positioned observer see a 3D image. Conventional fixed parallax barriers have several disadvantages including a narrow viewing angle and a dark image resulting from absorption of light by the light barriers.

A content-adaptive autostereoscopic device also comprises at least two, spaced-apart layers. However, the parallax barrier layer does not have a fixed pattern, but rather a light-transmissive, non-binary image that can be varied according to the content to be produced. Essentially, a light-transmissive independently controllable device is used as the parallax barrier and a second independently controllable device forms the rear layer. The combination of two variable layers allows a wider viewing angle and a brighter image than those that are possible with a fixed parallax barrier. This, however, comes at the cost of a significantly more complex device requiring a controller that is able to coordinate the images produced by the first and second layers. In addition, multiple layers of imaging media and electrode layers impairs the transparency of the parallax barrier layer.

Autostereoscopic devices incorporating a conventional parallax barrier are produced from at least two separately printed images, at least one of which is disposed on a substrate, that are subsequently joined together into registration with precision. Similarly, autostereoscopic devices having a content-adaptive parallax barrier are produced from two separate displays (e.g., LCD displays) that require precise registration to each other.

Thus, there is a need for improved 3D devices having parallax barriers.

SUMMARY OF THE INVENTION

Aspects of the present invention overcome the drawbacks of previous systems and methods by providing autostereoscopic devices and methods of generating images by using a single addressing unit, or two addressing units, to address two image-forming layers.

In one aspect, an autostereoscopic device for generating an autostereoscopic image is provided. The device comprises a substrate, a first image-forming layer disposed on the substrate, a second image-forming layer, a light-transmissive layer positioned between the first image-forming layer and the second image-forming layer, and an addressing unit comprising a heating element. The first and second image-forming layers comprise a first and second material, respectively, having a thermally adjustable optical property. The addressing unit is configured to apply heat to the first image-forming layer and the second image-forming layer. The first image-forming layer and the second image-forming layer generate an autostereoscopic image.

In another aspect, an autostereoscopic device for generating an autostereoscopic image is provided that comprises a substrate, a first image-forming layer disposed on the substrate, a second image-forming layer, a light-transmissive layer positioned between the first image-forming layer and the second image-forming layer, a first addressing unit comprising a first heating element and a second addressing unit comprising a second heating element. The first and second image-forming layers comprise a first and second material, respectively, having a thermally adjustable optical property. The first addressing unit is configured to apply heat to the first image-forming layer and the second addressing unit is configured to apply heat to the second image-forming layer. The first image-forming layer and the second image-forming layer generate an autostereoscopic image.

In another aspect, an autostereoscopic device is disclosed comprising a substrate comprising a plurality of electrodes, a first layer of microcapsules located on the substrate comprising a first dispersion of electrophoretic particles, a second layer of microcapsules comprising a second dispersion of electrophoretic particles, and a layer of light-transmissive microcapsules between the first and second layer. The light-transmissive microcapsules may consist essentially of a light-transmissive fluid.

In yet another aspect, a method of producing an autostereoscopic image is provided. The method comprises the steps of (a) providing an autostereoscopic device comprising a substrate, a first image-forming layer comprising a first material having thermally adjustable optical properties, the first image-forming layer disposed on the substrate, a second image-forming layer comprising a second material having thermally adjustable optical properties, a light-transmissive layer positioned between the first and second image-forming layers, and an addressing unit comprising a heating element; and (b) heating the first and second image-forming layers with the addressing unit, such that the first and second image-forming layers generate an autostereoscopic image. The method may further comprise the steps of (c) providing three-dimensional image data to a controller; (d) computing an image to be produced by the first and second image-forming layers; and (e) controlling the heat applied by the addressing unit to the first and second image-forming layers. The autostereoscopic device used for the method may further comprise a second addressing unit and the heating step may comprise heating the first image-forming layer with the addressing unit and heating the second image-forming layer with the second addressing unit.

In another aspect, a method of producing an autostereoscopic image is provided. The method comprises the steps of (a) providing an autostereoscopic device comprising a substrate having a plurality of electrodes, a first layer of microcapsules located on the substrate comprising a first dispersion of electrophoretic particles, a second layer of microcapsules comprising a second dispersion of electrophoretic particles, and a layer of light-transmissive microcapsules between the first and second layer; (b) providing a three-dimensional image data to a controller; (c) computing an image to be displayed by the first and second layers of microcapsules; and (d) controlling the plurality of electrodes, such that the plurality of electrodes apply an electric field to the first and second layers of microcapsules and the first and second layers of microcapsules generate the autostereoscopic image. The light-transmissive microcapsules of the autostereoscopic device used in the method may consist essentially of a light-transmissive fluid.

It is to be appreciated that the features described above can be combined in any number of various ways to describe devices or methods that incorporate features disclosed herein.

The foregoing advantages of the invention will appear in the detailed description, which follows. In the description, reference is made to the accompanying drawings, which illustrate preferred aspects.

The invention may be embodied in several forms without departing from its spirit or essential characteristics. The scope of the invention is defined in the appended claims, rather than in the specific description preceding them. All aspects that fall within the meaning and range of equivalency of the claims are therefore intended to be embraced by the claims.

DETAILED DESCRIPTION

The invention will now be described more specifically with reference to the following aspects. It is to be noted that the following aspects are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As used herein, "consisting essentially of" means that the composition or component may include additional ingredients, but only if the additional ingredients do not materially alter the basic and novel characteristics of the claimed compositions or methods.

Furthermore, the disclosed subject matter may be implemented as a device, method, apparatus, or article of manufacture using standard programming and/or engineering techniques and/or programming to produce hardware, firmware, software, or any combination thereof to implement aspects detailed herein.

The various aspects of the invention will be described in connection with a device for producing an autostereoscopic image. The features and advantages that arise due to aspects of the invention are well suited to this purpose. Still, it should be appreciated that the various aspects of the invention can be applied to other applications and to achieve other objectives as well.

Figure 1:
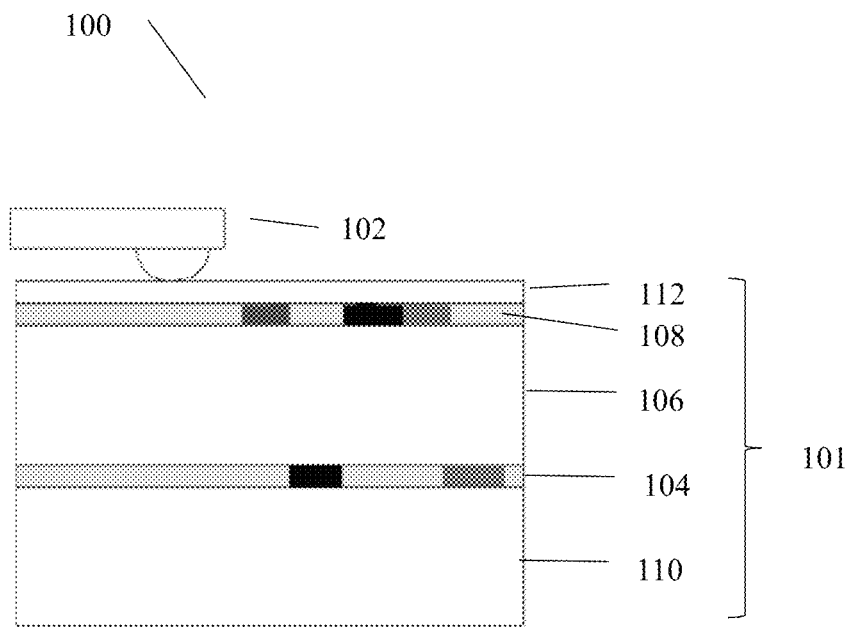
FIG. 1 is a schematic side view of a device for generating an autostereoscopic image according to a first embodiment of the present invention.

Referring now to the Figures, and more particularly FIG. 1, a device for generating an autostereoscopic image according to a first embodiment of the present invention is shown. The device 100 includes an imaging member 101 and an addressing unit 102. The imaging member 101 includes a first image-forming layer 104 disposed on a substrate 110, a second image-forming layer 108, and a light-transmissive layer 106 disposed between the first image-forming layer 104 and the second image-forming layer 108. The first image-forming layer 104 and the second image-forming layer 108 are preferably light-transmissive and colorless, but contain a material having a thermally adjustable optical property. As used herein, "light-transmissive" layer means that sufficient light is transmitted through the layer designated as light-transmissive to enable an observer, looking through that layer from one side, to observe the change in optical states of the layer or another material on an opposing side of the layer. The material having a thermally adjustable optical property in the first and second image-forming layers may absorb specific wavelengths of light as defined by a first absorption spectrum and a second absorption spectrum respectively. In some aspects of the invention, the first and second absorption spectra are the same, that is, identical wavelengths of light that can be absorbed. However, in other aspects, the first and second absorption spectra overlap, but are not identical. The thermally adjustable optical property of the first material transitions at a first temperature and the thermally adjustable optical property of the second material transitions at a second temperature. The first temperature may be greater than the second temperature.

An optional light-transmissive protective layer 112 may also be disposed on the first image-forming layer 104. In yet another aspect, the substrate 110 may include a reflective sheet (not shown in FIG. 1), if the imaging member 101 is intended to form a reflective device. Alternatively, the substrate 110 may be a release sheet that is subsequently removed, so that the imaging member 101 may be laminated onto a light emitting member (not shown in FIG. 1) comprising a backlight for illuminating the image-forming layers and provide an emissive device.

The image-forming layers 104 and 108 are optically adjustable so that their respective absorption spectra can be altered when the addressing unit 102 is used to address the imaging member 101. The addressing unit 102 is capable of addressing the first image-forming layer 104 and the second image-forming layer 108 substantially simultaneously, thereby providing an auto registered autostereoscopic device. As previously explained, the image-forming layers 104 and 108 are preferably light-transmissive and colorless; however, specific locations on the image-forming layers may be addressed individually so that the color, i.e. absorptive/reflective properties, of the specific locations is adjusted. This allows a unique image to be produced on each of the image-forming layers. When adjusted, either the first or second image-forming layers 104 and 108 may form a parallax barrier, while the other of the first and second image-forming layer 104 and 108 provides a rear image to be viewed through the parallax barrier, and together the optically adjusted first and second image-forming layers 104, 108 generate an autostereoscopic image.

In one aspect, a desired three-dimensional image is provided to a controller, which computes the images to be produced on the first and second image-forming layers to form the three-dimensional image. As used herein, the term "controller" may include one or more processors and memories and/or one or more programmable hardware elements and is intended to include any types of processors, CPUs, microcontrollers, digital signal processors, or other devices capable of executing software instructions. The controller communicates the images to be produced to the addressing unit 102, which adjusts the first image-forming layer 104 and second image-forming layer 108 accordingly. In some aspects, the controller may be a component of the device 100; however, the computation of the images to be produced may also be done remotely and communicated to the device 100.

In one non-limiting aspect of the invention, the first image-forming layer 104 and the second image-forming layer 108 are thermally sensitive. The application of heat to one location of the image-forming layers changes the optical property of the material within that location, such that its respective absorption spectrum is adjusted. The addressing unit 102 has a heating element for applying heat to the imaging member 101 and the light-transmissive layer 106 may be thermally insulating to control the transmission of heat through the imaging member 101. Because the addressing unit 102 is in contact with only one surface of the imaging member 101, the first image-forming layer 104 may be less sensitive to heat than the second image-forming layer 108, so that a variation in the time and intensity of heat applied to the surface of the imaging member 101 enables the materials in the first image-forming layer 104 and second image-forming layer 108 to be optically adjusted independently. The degree of light transmissivity or color of the adjusted regions in the first and second image-forming layers 104, 108 may also be varied, thereby improving the viewing angle of the image produced by the device.

An example of a device comprising a single addressing unit able to individually adjust the first and second image-forming layers is disclosed, for example, in U.S. Pat. No. 7,408,563, the entire content of which is incorporated by reference herein. The device eliminates the extra step of precisely registering the first and second image-forming layers by providing for the substantially simultaneous formation of the parallax barrier and rear image from two pre-laminated image-forming layers. In another embodiment, the device may include a second addressing unit that is applied to an opposing surface of the imaging member, such that the first addressing unit adjusts the optical properties of the first image-forming layer and the second addressing unit adjusts the optical properties of the second image-forming layer.

A direct thermal imaging technique may be used to form an image by heating the corresponding image-forming layer, which may be initially colorless, by the addressing unit. In direct thermal imaging, there is no need for ink, toner, or thermal transfer ribbon. Rather, the chemistry required to form an image is present in the imaging member itself. A discussion of various direct thermal color imaging methods is provided in U.S. Pat. No. 6,801,233 B2, the entire content of which is incorporated by reference herein. In the method of the present invention, an imaging member having two or more image-forming layers is addressed by an addressing unit, which may be a thermal printing head, to provide a colored image. The image may comprise multiple colors. The imaging member may be addressed in more than one pass of the addressing unit, at least one pass being at a different speed from at least another pass. Optionally, the imaging member is preheated to a different extent in at least one pass than in at least another pass. The heating may be direct heating or indirect heating. Each image-forming layer can change color, e.g., from initially colorless to colored, where it is heated to a particular temperature referred to herein as its activating temperature. All the layers of the image member may be transparent before color formation. The image-forming layers may be addressed at least partially independently by variation of two adjustable parameters, namely, temperature and time. These parameters can be adjusted to obtain the desired results in any particular instance by selecting the temperature of the addressing unit (e.g. the thermal printing head) and the period of time during which heat is applied to the thermal imaging member. Thus, each color of a multicolor imaging member can be printed alone or in selectable proportion with the other colors. The temperature-time domain is divided into regions corresponding to the different colors that it is desired to obtain in the final image. The image-forming layers of the imaging member undergo a change in color to provide the desired image in the imaging member. The change in color may be from colorless to colored, from colored to colorless, or from one color to another. The term "image-forming layer" includes all such options. Each of the image-forming layers may be independently addressed by application of heat with a thermal printing head in contact with the topmost layer of the member. In imaging members with two image-forming layers, the activating temperature of the second image-forming layer (that is, the image-forming layer closest to the surface of the thermal imaging member) is greater than the activating temperature of the first image-forming layer.

Referring now to FIGS. 2A to 2E, a second embodiment of a device according to the present invention is illustrated. FIGS. 2A to 2E illustrate an imaging member of a device for generating an autostereoscopic image. The imaging member comprises a first image-forming layer 204 and a second image-forming layer 208 separated by a light-transmissive layer 206. A substrate 210 on which the first image-forming layer is located includes a plurality of electrodes for addressing the first and second image-forming layers 204 and 208.

The first image-forming layer 204 and the second image-forming layer 208 preferably each comprise a plurality of light-transmissive microcapsules containing dispersions of electrophoretically responsive particles disposed in a carrier medium, such as a fluid. The electrophoretic particles in the first and second image-forming layers may or may not have the same absorption spectra and/or electrophoretic mobility.

Numerous patents and applications assigned to or in the names of the Massachusetts Institute of Technology (MIT) and E Ink Corporation describe various technologies used in encapsulated electrophoretic and other electro-optic media. The technologies described in the these patents and applications, the entire contents of which are incorporated by reference herein, include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; and 7,715,088;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348; and (j) Non-electrophoretic displays, as described in U.S. Pat. No. 6,241,921; and U.S. Patent Application Publication Nos. 2015/0277160; 2015/0005720; and 2016/0012710.

Encapsulated electrophoretic media comprise one or more types of charged pigment particles that move through the fluid under the influence of an electric field, forming an image. Encapsulated electrophoretic media may comprise numerous small capsules, each of which itself comprises a charged pigment particles in a fluid medium, and a capsule wall surrounding the internal phase. Typically, the capsules are themselves held within a polymeric binder to form a coherent layer positioned between two electrodes. Alternatively, the charged particles and the fluid may be retained within a plurality of sealed cavities formed within a carrier medium, typically a polymeric film, often referred to as microcells.

Although electrophoretic media are often opaque (since, for example, in many electrophoretic media, the particles substantially block transmission of visible light through the display) and operate in a reflective mode, many electrophoretic films can be made to operate in a so-called "shutter mode" in which one optical state is substantially opaque and one is light-transmissive. See, for example, U.S. Pat. Nos. 5,872,552; 6,130,774; 6,144,361; 6,172,798; 6,271,823; 6,225,971; and 6,184,856. Examples of the can operate in such a mode include dielectrophoretic displays, which are similar to electrophoretic displays but rely upon variations in electric field strength; see U.S. Pat. No. 4,418,346.

In order to provide the required distance between the first image-forming layer 204 and the second image-forming layer 208 (illustrated in FIGS. 2A to 2E), the light-transmissive layer 206 may comprise one or more rows of light-transmissive capsules consisting essentially of a light-transmissive fluid and not containing optically adjustable materials, such as electrophoretic particles, such that the optical properties of the light-transmissive layer 206 remain substantially constant during operation of the device. Display devices formed by applying successive rows of encapsulated electrophoretic media and methods of driving the devices are disclosed, for example, in U.S. Pat. No. 8,576, 476, the entire content of which is incorporated by reference herein.

Figure 2A:
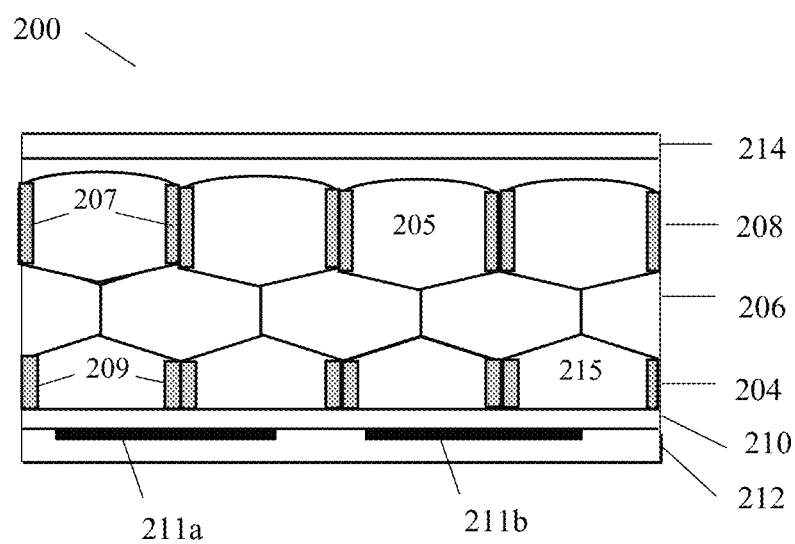
FIGS. 2A to 2E are schematic side views of a device for generating an autostereoscopic image according to a second embodiment of the present invention.

The plurality of electrodes 211a and 211b may be used to apply an electric field to the image-forming layers 204 and 208 of an image member 200, shown in FIG. 2A. Applying an electric field to the first and second image-forming layers 204 and 208 causes the particles to move within their respective capsules, adjusting the respective optical properties of the image-forming layers. The plurality of electrodes 211a and 211b can control the first image-forming layer 204 and the second image-forming layer 208 from one side of the imaging member 200, thereby eliminating the need for any intervening electrode or conductive layers that may adversely affect the light transmissivity of the device. Depending on the applied voltage waveform, the electrophoretic particles may be driven towards various locations within their respective capsules, adjusting the respective optical properties of the image-forming layers. For example, referring to FIG. 2A, the electrophoretic particles 209 in the first image-forming layer 204 and the electrophoretic particles 207 in the second image-forming layer 208 may have a similar charge polarity and may be driven towards a transparent "open" state, wherein the particles aggregate towards the lateral walls of the capsules.

Figure 2B:
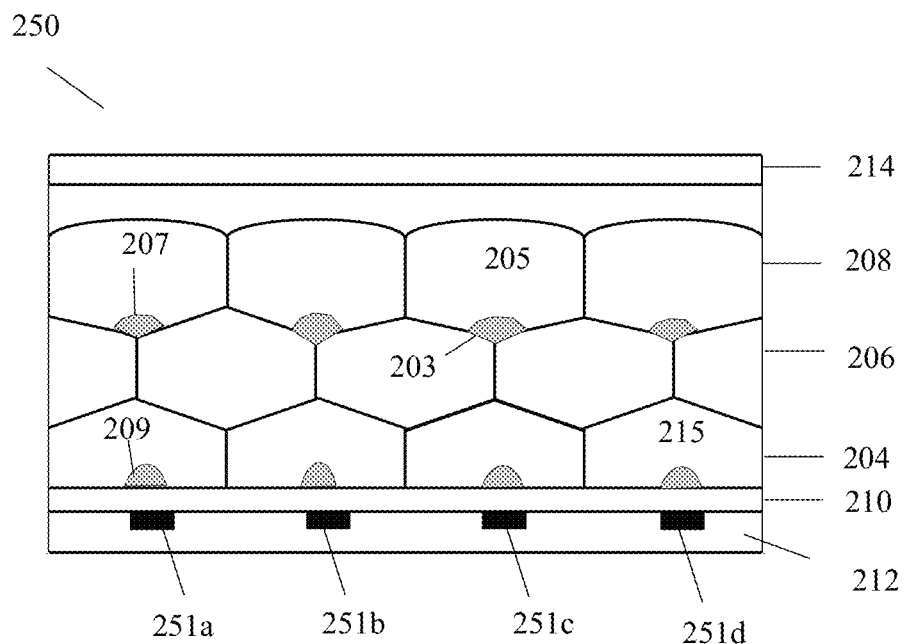

In another example depicted in FIG. 2B, an image member 250 comprises electrodes 251a to 251d that are in the form of concentrator electrodes. The electrophoretic particles 209 in the first image-forming layer 204 and the electrophoretic particles 207 in the second image-forming layer may have a similar charge polarity, such that the particles in both image-forming layers may be driven towards the plurality of electrodes. In this example, the particles 209 in the first image-forming layer 204 are shuttered by being concentrated into a small area in proximity to the electrode. Similarly, because the microcapsules 205 in the second image-forming layer 208 may include a conical or pyramidal-shaped well 203, the particles 207 in the second image-forming layer 208 may also be shuttered by concentrating the particles 207 into a small area, thereby providing an imaging member with a transparent optical state.

Figure 2C:
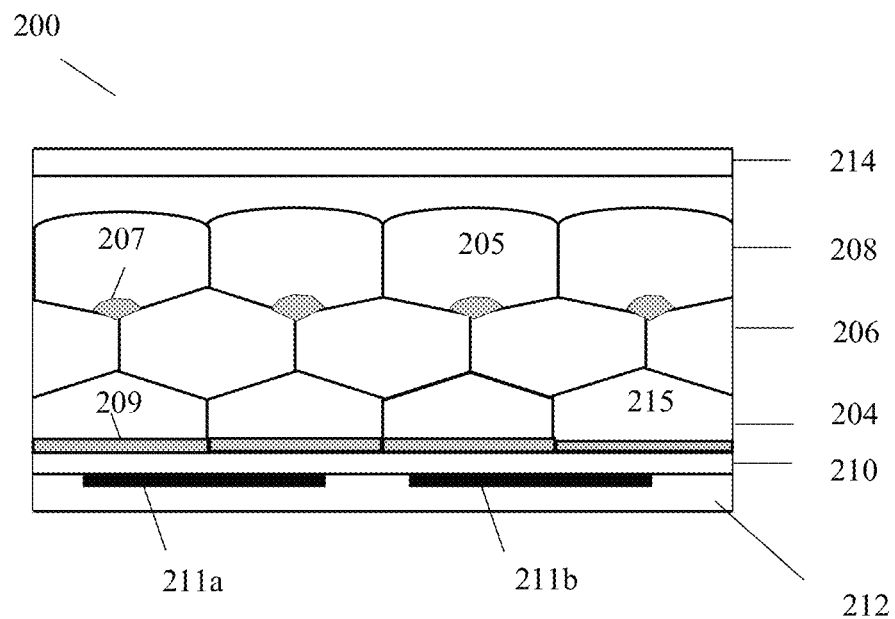
Figure 2D:
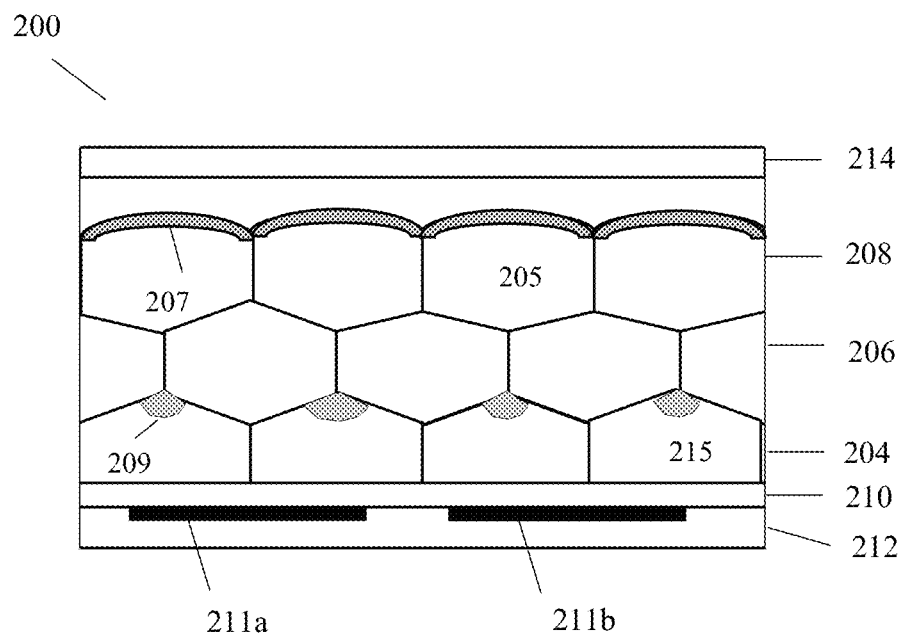
Figure 2E:
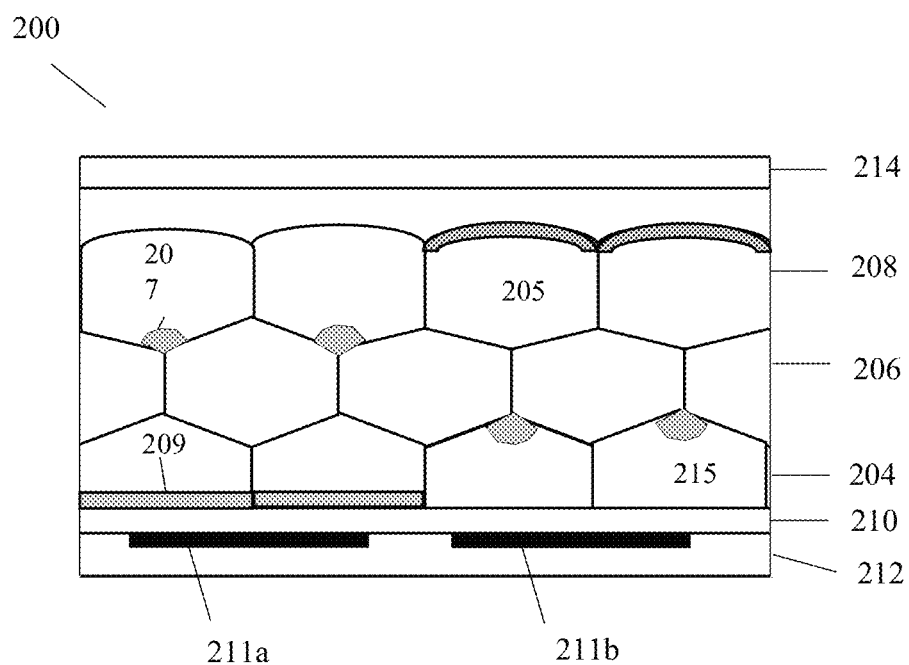

In FIG. 2C, addressing the microcapsules at a different frequency or voltage may cause the particles 209 to spread out, such that an observer will observe the optical property of the particles 209. In FIG. 2D, the polarity of the electric field is reversed, in relation to the electric field of FIG. 2C. As a result, the particles 209 in the first image-forming layer 204 are shuttered by concentrating the particles 209 into the conical or pyramidal-shaped wells 201 of the microcapsules 215 in the first image-forming layer 204, and the particles 207 are spread out on one side of the microcapsules 208, so that the optical property of the particles 207 may be observed. As illustrated in FIG. 2E, because the electrodes 211a and 211b are independently addressable, the image-forming layers 204 and 206 may be adjusted differently in different pixel locations.

The imaging member 200 (illustrated in FIGS. 2A to 2E) may further include a protective layer 214 that may be adhered to the second image-forming layer 208 with an adhesive, preferably an optically clear adhesive. If the device is viewed from the side of the protective layer 214, the protective layer 214 is preferably light-transmissive. In addition, if the device is a reflective display, an optional reflective layer 212 may be incorporated below the first image-forming layer 212. In another embodiment, the substrate 210 may include a reflective material. Alternatively, if the reflective display is viewed from the opposing side (not from the side of the protective layer), the substrate 210 is preferably light-transmissive, and the protective layer 214 may be reflective. In yet another embodiment, the imaging member 200 may be used to form an emissive display, wherein it is preferred that both the protective layer 214 and substrate 210 are light-transmissive, so that a backlight may be applied to either side of the imaging member 20.

The imaging member may be further combined with a controller (not shown in FIGS. 2A to 2E) that, upon receiving a desired three-dimensional image, can compute an image to be produced on the first image-forming layer 204 and second image-forming layer 208. The controller may then control the plurality of electrodes to apply the electric field to microcapsules 205, 215 that will form the two images and generate an autostereoscopic image. The computation may be performed locally or remotely.

The foregoing has been a detailed description of illustrative aspects of the invention. Various modifications and additions can be made without departing from the scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate aspects. While the preferred aspect has been described, the details may be changed without departing from the invention, which is defined by the claims.

Finally, it is expressly contemplated that any of the processes or steps described herein may be combined, eliminated, or reordered. In other aspects, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

The invention claimed is:

1. An autostereoscopic device comprising:
   a substrate;
   a first image-forming layer comprising a first material having a thermally adjustable optical property, the first image-forming layer disposed on the substrate;
   a second image-forming layer comprising a second material having a thermally adjustable optical property;
   a light-transmissive layer positioned between the first image-forming layer and the second image-forming layer; and
   an addressing unit comprising a heating element, wherein the addressing unit is configured to apply heat to the first image-forming layer and the second image-forming layer, and
   wherein the first image-forming layer and the second image-forming layer generate an autostereoscopic image.

2. The autostereoscopic device of claim 1, wherein:
   the first image-forming layer has a first absorption spectrum, and
   the second image-forming layer having a second absorption spectrum,
   the first absorption spectrum and the second absorption spectrum are the same.

3. The autostereoscopic device of claim 1, wherein the thermally adjustable optical property of the first material transitions at a first temperature and the thermally adjustable optical property of the second material transitions at a second temperature.

4. The autostereoscopic device of claim 3, wherein the first temperature is greater than the second temperature.

5. The autostereoscopic device of claim 1, wherein the light-transmissive layer is thermally insulating.

6. The autostereoscopic device of claim 1, wherein one of the first and second image-forming layers is a parallax barrier.

7. A method of producing an autostereoscopic image comprising:
   providing the autostereoscopic device according to claim 1, and
   heating the first and second image-forming layers with an addressing unit, such that the first and second image-forming layers generate an autostereoscopic image.

8. The method of producing an autostereoscopic image according to claim 7 further comprising:
   providing three-dimensional image data to a controller;
   computing an image to be produced by the first and second image-forming layers; and
   controlling the heat applied by the addressing unit to the first and second image-forming layers.

9. An autostereoscopic image made according to the method of claim 7.

10. An autostereoscopic device comprising:
    a substrate;
    a first image-forming layer comprising a first material having a thermally adjustable optical property, the first image-forming layer disposed on the substrate;
    a second image-forming layer comprising a second material having a thermally adjustable optical property;
    a light-transmissive layer positioned between the first image-forming layer and the second image-forming layer;
    a first addressing unit comprising a heating element, wherein the first addressing unit is configured to apply heat to the first image-forming layer, and
    a second addressing unit comprising a heating element, wherein the second addressing unit is configured to apply heat to the second image-forming layer,
    wherein the first image-forming layer and the second image-forming layer generate an autostereoscopic image.

11. A method of producing an autostereoscopic image comprising:
    providing the autostereoscopic device according to claim 10,
    heating the first image-forming layer with the first addressing unit and the second image-forming layer with the second addressing unit, such that the first and second image-forming layers generate an autostereoscopic image.

12. The method of producing an autostereoscopic image according to claim 11 further comprising:
    providing three-dimensional image data to a controller;
    computing an image to be produced by the first and second image-forming layers; and
    controlling the heat applied by the first and second addressing units to the first and second image-forming layers.

13. An autostereoscopic image made according to the method of claim 11.

* * * * *